Dec. 1, 1970 — K. O. SNELLMAN — 3,544,426

METHOD OF MAKING PEPTIDES

Original Filed June 28, 1965

SYNTHESIS OF THE PEPTIDE
HIS-PHE-ARG-TRY-GLY-GLY-GLY-

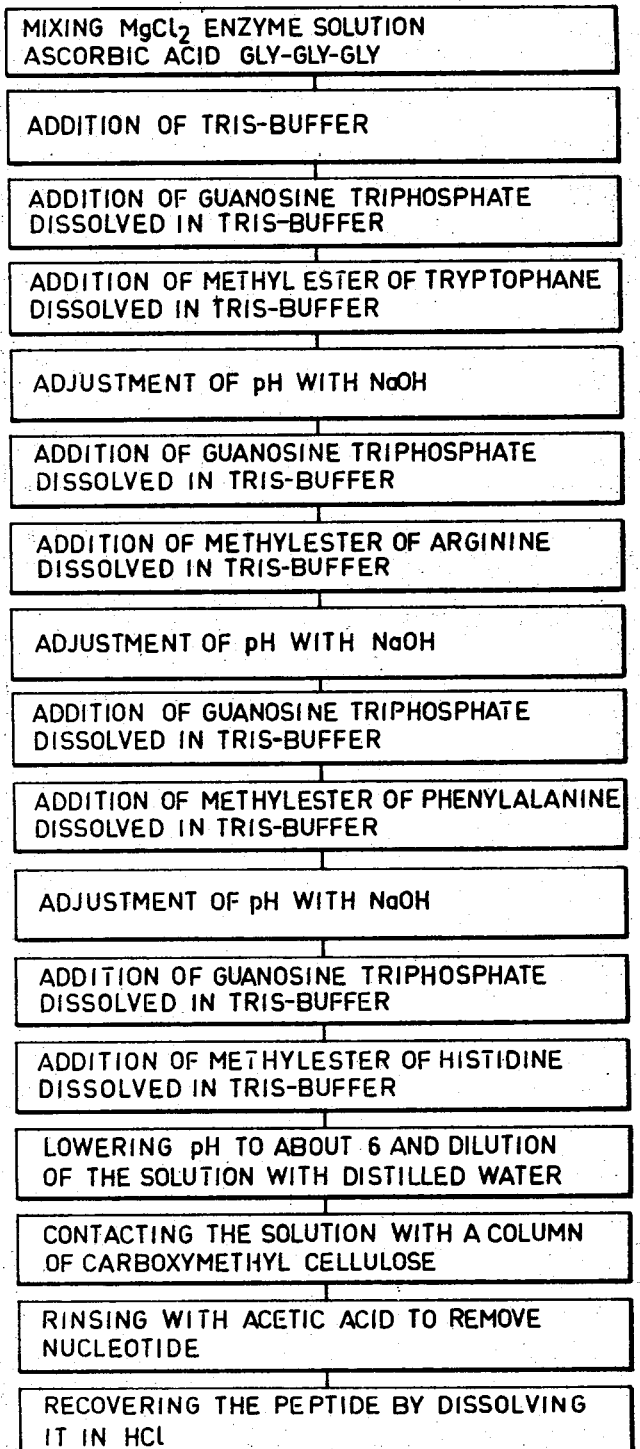

- MIXING MgCl₂ ENZYME SOLUTION ASCORBIC ACID GLY-GLY-GLY
- ADDITION OF TRIS-BUFFER
- ADDITION OF GUANOSINE TRIPHOSPHATE DISSOLVED IN TRIS-BUFFER
- ADDITION OF METHYL ESTER OF TRYPTOPHANE DISSOLVED IN TRIS-BUFFER
- ADJUSTMENT OF pH WITH NaOH
- ADDITION OF GUANOSINE TRIPHOSPHATE DISSOLVED IN TRIS-BUFFER
- ADDITION OF METHYLESTER OF ARGININE DISSOLVED IN TRIS-BUFFER
- ADJUSTMENT OF pH WITH NaOH
- ADDITION OF GUANOSINE TRIPHOSPHATE DISSOLVED IN TRIS-BUFFER
- ADDITION OF METHYLESTER OF PHENYLALANINE DISSOLVED IN TRIS-BUFFER
- ADJUSTMENT OF pH WITH NaOH
- ADDITION OF GUANOSINE TRIPHOSPHATE DISSOLVED IN TRIS-BUFFER
- ADDITION OF METHYLESTER OF HISTIDINE DISSOLVED IN TRIS-BUFFER
- LOWERING pH TO ABOUT 6 AND DILUTION OF THE SOLUTION WITH DISTILLED WATER
- CONTACTING THE SOLUTION WITH A COLUMN OF CARBOXYMETHYL CELLULOSE
- RINSING WITH ACETIC ACID TO REMOVE NUCLEOTIDE
- RECOVERING THE PEPTIDE BY DISSOLVING IT IN HCl

*INVENTOR.*
Karl Olof Snellman,
BY Pierce, Scheffler & Parker
his Attorneys

3,544,426

Patented Dec. 1, 1970

3,544,426
METHOD OF MAKING PEPTIDES

Karl Olof Snellman, Sollentuna, Sweden, assignor to Ingeniorsfirma H. Sundkvist, Stockholm, Sweden, a Swedish firm
Continuation of application Ser. No. 467,679, June 28, 1965. This application Sept. 23, 1968, Ser. No. 766,369
Claims priority, application Sweden, July 3, 1964, 8,164/64
Int. Cl. C12d *13/06*
U.S. Cl. 195—29                                2 Claims

ABSTRACT OF THE DISCLOSURE

Biologically active peptide chains are synthesized by reacting at a pH 7 to 8, a carboxylic acid ester with an amine in the presence of (a) an enzyme derived from animal tissue, e.g., calf liver, and (b) a phosphoric acid derivative of a nucleoside, the reaction being effective in the presence of magnesium ions. Initially produced peptide is then reacted with the same or a similar ester, in a stepwise condensation to produce a chain having a predetermined sequence of units.

---

This application is a continuation of patent application Ser. No. 467,679, filed June 28, 1965, now abandoned.

The invention concerns a method of making biologically active peptide chains which method is characterized in reacting an alpha amino carboxylic acid ester with an alpha-amino acid in the presence of an enzyme and a nucleotide. The reaction is preferably realized in the presence of magnesium ions. The nucleotide is a phosphoric acid derivative of a nucleoside such as adenosine, guanosine, inosine, cytidine, uridine and thymidine, particularly guanosine triphosphate, and the coenzyme portion of the enzyme is ascorbic acid. The reaction is best performed at a pH between 7 and 8, particularly at about 7.b. The amine is not to be ionized said amine presenting particularly a pK-value less than or equal to 8. The carboxylic acid ester is particularly an alkyl ester of an amino-acid.

The alpha-amino acid shall react as a starting agent in the process and particularly be iodinated amino acids such as diiodo tyrosine, thryoxine and preferred peptides are higher peptides, such as tripeptides.

The peptide first obtained is then reacted with further alpha-amino carboxylic acid ester of the same or another kind than the ester first reacted, thereby producing polypeptides whose peptide chains have a predetermined sequence. The enzyme is suitably prepared from tissues, such as calf liver such enzymes being prepared which react as catalysts for the formation of the polypeptide.

In a particular embodiment the carboxylic acid ester consists of a carbohydrate carboxylic acid ester.

It is known that certain enzymes have the power to form peptides between an ester and an amino group according to the formula

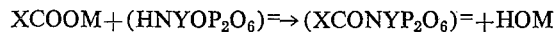

where M represents an alkali metal and X and Y represent an alkyl radical or a derivative of an alkyl radical.

An enzyme consists of a protein portion, apo-enzyme, which can be produced as a clean substance, and a co-enzyme (co-ferment) being according to the invention a redox agent such as ascorbic acid, D-asorbic acid, 6-desoxy ascorbic acid, L-rhamnose ascorbic acid, D-arabinose ascorbic acid, L-glucose ascorbic acid or analgous compounds or other suitable redox agents.

In the reaction the guanosine triphosphate is decomposed to guanosine monophosphate and pyrophosphate and one equivalent guanosine triphosphate is required to each equivalent peptide bond, —CONH—, being formed.

The reaction according to the invention is performed in several steps. The amino group is first phosphorylated and oxidized an alpha-pyrophosphorylated hydroxylamine derivative being obtained with the formula

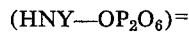

This hydroxylamine derivative is then reacted with the ester according to the equation $$XCOOM + (HNYOP_2O_6) = \rightarrow (XCONYP_2O_6) = + HOM$$

This compound is reduced and dephosphorylized, XCONHY and pyrophosphate being obtained.

The alkyl esters of the amino-acid preferably are the methyl or ethyl esters.

Esters of the following amino acids are suitable for the reaction according to the invention: glycine, alanine, valine, leucine, isoleucine, phenylalanine, proline, serine, threonine, cysteine, cystine, tryptophane, methionine, tyrosine, asparaginic acid, asparagine, glutamic acid, glutamine, lysine, arginine, histidine, sarcosine, betaine, hydroxypropline, alpha-aminoadipic acid, ornithine, gamma-aminobutyric acid, cysteic acid, taurine, lanthionine, azoserine, cycloseroine, phenylserine, chloroamphenicol and alpha, epsilon-diaminopimelic acid. Usually the L-isomers are used. The amino group of these esters like corresponding amino acids have very high pK-values, i.e. pK=9–10. Thus, the reaction cannot start with only the esters of the amino acids. A starting agent is required for the reaction according to the invention, and such starting agent is selected from suitable compounds with the guidance of the pK-value. Most dipeptides have pK-values of about 8.5. Tripeptides have in most cases pK-values of the amino group of 7.8–8. Higher peptides have pK-values of 7.6–7.8. Iodized amino acids have low pK-values. When producing the peptide a starting agent with a low pK-value is selected the coupling of amino acid ester being possible.

In the reaction according to the invention the enzyme, apo-enzyme and ascorbic acid are added to a solution of suitable composition and also to an equivalent of a starting agent (the amine) S and after that to an equivalent guanosine triphosphate the last substance being completely consumed and S' being completely activated.

An equivalent of the amino acid ester $A_1$ is then added to the solution being reacted when forming $SA_1$. No excess of guanosine triphosphate being available so no $SA_1$ can be activated and a by-product such as $SA_1A_2$ is not formed. When the reaction is complete a new equivalent guanosine triphosphate is added which activates $SA_1$ after which an amino acid ester $A_2$ is added, $SA_1A_2$ being formed. By reacting like that one obtains $SA_1A_2A_3$ ... $A_n$ by stepwise reactions.

The polypeptides produced according to invention are useful as hormones, e.g. hypophysic hormones, such as adrenocorticotropic hormones, etc., blood glucose lowering hormones and other biologically active substances such as plasma kninins and peptide antibiotics.

EXAMPLE 1

Synthesis of the peptide his-phe-arg-try-gly-gly-gly 10 ml. tris-buffer (0.1 M tris-HCl and 0.05 M KCl, pH 7.6) is added to 5 mM. MgCl₂, 5 μl. (microliters) enzyme solution (about 10 microg.), 0.1 mg. ascorbic acid and one equivalent gly-gly-gly (about 10 mg.).

The reaction vessel was provided with a stirrer and the pH-value of the solution was controlled electrometrically.

Guanosine triphosphate and the methyl esters of his, phe, arg, try, were measured in equivalent amounts to gly-gly-gly and were dissolved in the tris-buffer.

To said solution is added one equivalent amount guanosine triphosphate and after about one minute the methyl ester of tryptophan. The altering of the pH was compensated with 0.1 M NaOH. After two to three minutes a new equivalent guanosine triphosphate is added and after about one minute the methyl ester of arginine and the pH value were compensated. On the same way the other esters are then added.

When the last ester has been added pH is lowered to about 6 and the solution is diluted with distilled water to about the three fold volume and is brought to a column of carboxymethyl cellulose and is rinsed with 0.01 M acetic acid to remove the nucleotide, the peptide then being dissolved in 0.1 M HCl. A yield of about 90% can be calculated.

The peptide obtained was analysed by chromatographic methods on paper in the system butanol, acetic acid, water (4:1:5). Besides, the common development with ninhydrin special reagents were used in order to identify certain amino acids, and in such case try, his, arg. In the chromatography of the peptide only one distinct spot was obtained with $Rf=0.85$ with different development methods.

The peptide was incubated with trypsine and chymotrypsin. The arrows in the formula below show where the splitting is to be expected.

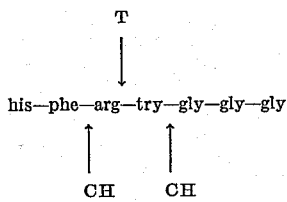

Chromatography of peptide incubated with trypsine gave two spots:

| Rf positive test for: | Corresponds to |
|---|---|
| 0.27 try | Try-gly-gly-gly. |
| 0.50 his and arg | His-phe-arg. |

Chymotrypsin splits anomaly and only partially at try.

| Rf positive test for: | Corresponds to |
|---|---|
| 0 arg and try | Arg-try. |
| 0.2 only nonhydrin | Gly-gly-gly. |
| 0.3 arg and try | Arg-try-gly-gly-gly. |
| 0.5 his | His-phe. |

The peptide behaves as expected at the analysis. In the incubations all original peptide disappeared ($Rf=0.85$). This means that no racemization had occurred in the synthesis otherwise only a partially decomposition should have been obtained.

EXAMPLES 2–7

According to this example the effect of the so-called melanocyte stimulating hormones have been tested on amphibians. When these animals are subjected to light treatment the melanin-granules are collected around the nucleus forming a dark spot. Under the influence of the hormone the granules spread out more and more and the cell can at the end be somewhat intersected by a dark network. This process is very easy to observe.

The different substances being synthesized have all been tested on the normal frog *Rana temporalia*. The melanocytes appeared as black round spots but when stimuli is injected they change on different ways depending on the strength of stimuli. Hogben and Slome have stated an index scheme with five different steps intermediary statistically being obtained. This index system has been used to measure the activity of the different preparations.

The following peptides have been synthesized according to the invention:

| Ex. No. | Peptide | Name |
|---|---|---|
| 2 | ac-ser-tyr-ser-met-glu-his-phe-arg-try-gly-lys-pro-val-gly-gly-gly. | Alpha-MSH. |
| 3 | ser-tyr-ser-met-glu-his-phe-arg-try-gly-lys-pro-val-gly-lys-lys-arg-arg-pro-val-lys-val-gly-gly-gly. | ACHTH (I-22). |
| 4 | ac-ser-tyr-ser-met-glu-gly-phe-arg-try-gly-lys-pro-val-gly-gly-gly. | 6-glycin-alpha-MSH. |
| 5 | ac-ser-tyr-ser-met-glu-his-phe-arg-gly-lys-pro-val-gly-gly-gly. | 9-glycin-alpha-MSH. |
| 6 | ac-ser-tyr-ser-met-glu-his-phe-arg-his-gly-lys-pro-val-gly-gly-gly. | 9-histidin-alpha-MSH. |
| 7 | ac-ser-tyr-ser-met-glu-his-ala-his-try-gly-lys-pro-val-gly-gly-gly. | 7-alanin-8-histidin-alpha-MSH. |

The table below shows the values of the activities of the different synthetisized peptides. The values are relative activities when the value of alpha-MSH is 1.

TABLE

| Peptide: | Activity |
|---|---|
| Alpha-MSH | 1. |
| 6-glycin-alpha-MSH | Inactive. |
| ACTH (I–22) | 0.01. |
| 9-glycine-alpha-MSH | 0.0025. |
| 9-histidine-alpha-MSH | 0.13. |
| 7-ala-8-his-alpha-MSH | 2.0. |

According to the invention the melanocyte stimulating hormone has not only been made but also a couple derivatives of the same. In these derivatives an important amino acid has been changed from another one in the sequence. In the case of 6-glycine-alpha-MSH an inactive derivative is obtained. However, this derivative has the possibility to be put on the receptor place of the peptide and it acts in this way as an inhibitor no activity being obtained if active peptide is added after injection of the inactive one. The peptide 7-ala-8-his-alpha-MSH is of interest having a greater activity than any other melanocyte stimulating hormone. It gives furthermore an effect which lasts about 4 times longer than the usual hormone.

Thus, there is the possibility to synthetisize physiologically active hormone peptides and derivatives of them and thereby increase or decrease or inhibit and extend the physiologically effect.

Preparation of the apo-enzyme

The preparation of the enzyme can be performed in the following way:

1 kg. fresh calf liver was coarse-ground and then homogenized in 1 l. 0.5 M phosphate buffer, pH 7.6, to which 10 g. sodium desoxycholate is added. The solution was made acid to pH 5 and the precipitate being formed was immediately separated the pH being controlled to pH 7.6. Ammonium sulphate was added to the solution to 38% (w./v.) A precipitate was rejected. The supernatant solution was made 50% (w./v.) with respect to ammonium sulphate. The precipitate obtained is filtered and was dissolved in slightly ammoniacal water and was dialyzed under control at a pH of 7. The very strong dark red liquid obtained was decolorized by adding 3 g. active carbon. The carbon was filtered and the solution is passed through a diethylaminoethyl cellulose ion-exchange (DEAE—) column. The column was rinsed with 100 ml. 0.15 M KCl containing 0.02 M phosphate buffer, pH 7.6. The enzyme was liberated with 0.25 M KCl 0.02 M phosphate buffer, pH 7.6. The solution obtained was dialyzed against distilled water. The solution was freeze-dried.

The freeze-dried material was dissolved in 70% ethanol containing 0.001 M $HgCl_2$, thus obtaining a 5% solution. The solution is completely clear and was stored in an icebox. After some time square flat crystals were crystallized. Yield about 80 mg.

The mercury salt is inactive but very stable. When enzyme for testing is needed a small portion of the crystals are removed from the store and are dissolved in a small quantity water and brought on an IRC 400 (marketed under the trade name "Amberlite") ion-exchange column in thioacetic acid cycle. The enzyme is in that way obtained which is free from mercury and can be in an active form with ascorbic acid.

The process of the present invention will be further illustrated in the accompanying single figure of drawing showing steps in the synthesis of the peptide his-phe-arg-try-gly-gly-gly.

I claim:

1. A method of making a biologically active polypeptide which comprises phosphorylating with a nucleotide an amino group of a methyl or ethyl ester of an amino acid, said nucleotide being a triphosphate of a nucleoside selected from the group consisting of adenosine, guanosine, inosine, cytidine, uridine and thymidine, and then oxidizing the phosphorylated compound thereby forming an alpha pyrophosphorylated hydroxylamine compound;

reacting said hydroxylamine compound with a carboxylic acid ester of an amino acid, in the presence of an enzyme, derived from calf liver, which enzyme catalyzes formation of polypeptides and which consists of a proteinaceous apo-enzyme portion and a co-enzyme portion which is a redox agent comprising an ascorbic acid compond, the reaction mixture being maintained at a pH between 7 and 8 and being buffered with a buffering agent containing magnesium ions, whereby a peptide is formed; and reducing and dephosphorylating the resulting peptide; and reacting the resulting peptide with a further alkyl ester of an amino acid thereby forming a polypeptide.

2. A method claimed in claim 1, in which the nucleotide is guanosine triphosphate.

References Cited

Greenstein et al.: Chemistry of Amino Acids, vol. 2, chapter 10, 1961.

Schröder et al.: The Peptides, pp. 306–7, Academic Press, 1965.

A. LOUIS MONACELL, Primary Examiner

G. M. NATH, Assistant Examiner

U.S. Cl. X.R.

260—112.5